E. A. LELAND.
Method of Bending Plumbers' Traps.
No. 203,842. Patented May 21, 1878.
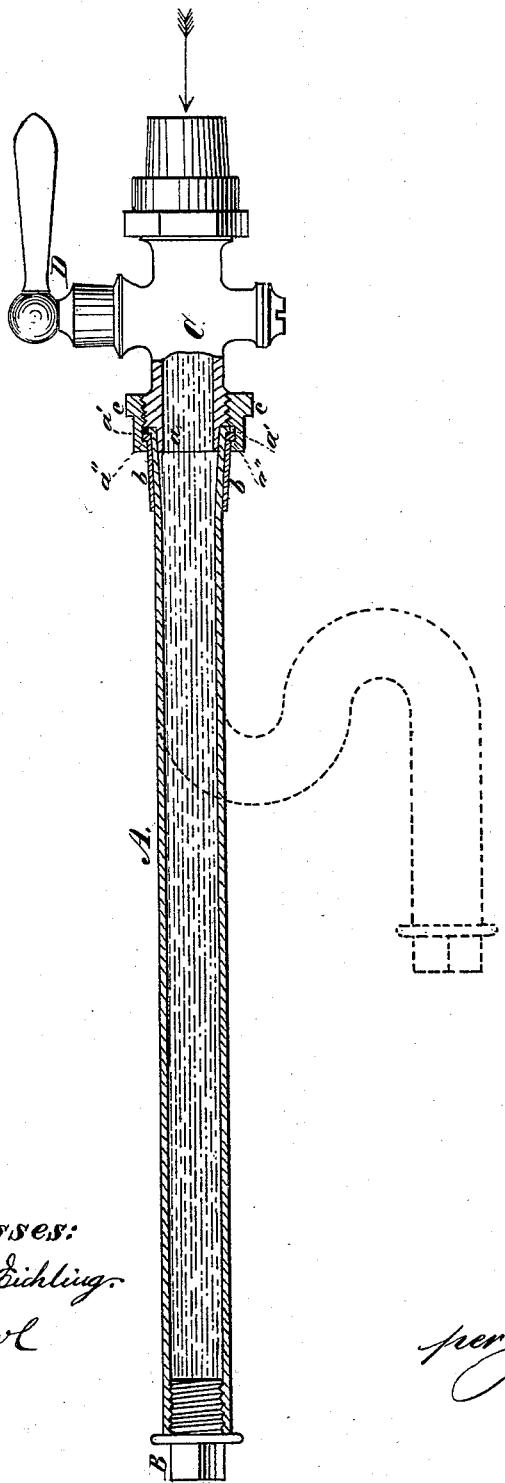
Witnesses:
Henry Eichling.
D. P. Cowl
Inventor:
Edwin A. Leland
per James A. Whitney
Atty.

UNITED STATES PATENT OFFICE.

EDWIN A. LELAND, OF NEW YORK, ASSIGNOR, BY MESNE ASSIGNMENT, TO THOMAS C. MILES, OF NEW YORK, N. Y.

IMPROVEMENT IN THE METHODS OF BENDING PLUMBERS' TRAPS.

Specification forming part of Letters Patent No. 203,842, dated May 21, 1878; application filed November 1, 1877.

*To all whom it may concern:*

Be it known that I, EDWIN A. LELAND, of the city, county, and State of New York, have invented certain Improvements in Processes for Bending Metal Pipes, of which the following is a specification:

This invention is more particularly intended for the manufacture of plumbers' traps from ordinary lead pipe; but it may also be applied for bending metallic pipe for various other purposes.

The invention comprises a novel method of preventing the flattening or crushing inward of the pipe at the bends during the operation of bending, by filling the pipe with a fluid held under such pressure as to resist the inward tendency of the pipe under the strain exerted in the bending aforesaid.

The invention further comprises in such process or method the heating of the fluid, in order to increase the flexibility of the metal, thereby rendering the flexure or bending thereof more easy.

The drawing illustrates the manner in which my aforesaid invention may be carried into practice.

A is the pipe to be bent, which pipe may be of any desired length—as, for example, a length sufficient to make a number of plumbers' traps— the pipe being in such case of lead; or, if preferred, the pipe may be of a length sufficient for one trap only, as indicated in the drawing. One end of this pipe A is securely closed by a screw-plug, B, or other suitable means. The opposite end of said pipe is attached to a nozzle or outlet, C, connected with a hydraulic press or equivalent apparatus, for compressing the liquid, as hereinafter set forth, within the pipe to any requisite pressure in said pipe.

The construction and operation of hydraulic presses being well known, and the connection of the nozzle C therewith being within the skill of an ordinary mechanic, no special description thereof is here required.

The nozzle C may be provided with a cock or faucet, D, whereby the outflow of liquid from the hydraulic press to the pipe may be shut off. When the latter is removed the connection of the pipe A to the nozzle C may be made by means of the coupling having the internal thimble $a$ fitted into the end of the pipe, the latter having a circumferential flange, $a'$, and being made with a flaring external sleeve, $b$. The coupling-nut $c$ being screwed home holds upon the flange $a''$ of the aforesaid sleeve, and draws the same inward to compress the extremity of the pipe between said sleeve, the thimble $a$, and the shoulder at the inner end thereof, thereby firmly and snugly connecting the pipe and the nozzle C.

Of course, any other suitable means of attaching the pipe to the nozzle or outlet of the hydraulic press may be employed. The pipe A being thus closed at its outer end and attached at its inner end to the hydraulic press, a fluid—as, for example, water, brine, or oil— is forced from the hydraulic press into the pipe to a pressure sufficient, when the pipe is bent, to counteract the tendency of the pipe to be flattened, distorted, or crushed inward at the place where bent.

In practice the degree of pressure required will vary very much, according to the diameter of the pipe, the character of the metal of which said pipe is made, and the thickness of the walls of the pipe. It may be said to range in general from one hundred to two hundred pounds to the square inch. The pipe, being thus filled with the fluid under pressure, as aforesaid, is bent by any suitable means to any required shape—for example, into that of an ordinary plumber's trap, as indicated in dotted outline in the drawing—the outward pressure of the fluid within the pipe counteracting the inward pressure exerted upon portions of the walls of the pipe during the operation of bending, and thereby causing it to retain its cylindric cross-section at all parts of the bend or bends made therein. The curved pipe or traps may be made by this means with a cold liquid—as, for example, water at ordinary temperature; but, by heating the fluid—for example, water, brine, or oil—the ductility and flexibility of the metal are increased, so that the operation of bending is rendered more easy, the advantage thus resulting being within certain limits proportioned to the increase of temperature of the liquid.

I do not limit myself to the precise apparatus herein shown for applying the fluid under pressure within the pipe, nor to any specific means or apparatus for bending the same, as such may be varied within wide limits. Neither do I confine my said invention to the manufacture of lead traps; but the same may be used for bending pipes of various kinds designed for other purposes. I have to say, however, that I not claim the manufacture of traps by first bending the soft-metal tube into the approximate shape in dies, and then forcing said bent tube against the walls of a surrounding die by pressure of a fluid applied within the tube to give it a final form, such manufacture being hitherto known, and being radically different in principle and operation from my invention, my said invention dispensing entirely with the use of dies, both for giving approximate and final shape to the traps.

What I claim as my invention is—

1. The herein-described improvement in the method of making plumbers' traps and bent pipes, namely, first filling the pipe with a fluid under pressure sufficient to counteract the tendency of the walls of the pipe to bend inward, and then bringing the pipe to the requisite curved or trap-like shape by bending, substantially as herein set forth.

2. In the above-named method, heating the fluid used under pressure in the pipe, in order to increase the flexibility of the pipe and consequent ease and facility of bending to shape, substantially as herein set forth.

EDWIN A. LELAND.

Witnesses:
 EDWARD HOLLY,
 HENRY EICHLING.